Oct. 24, 1933.                O. V. MARTIN                1,932,364
              APPARATUS FOR PREPARING METALLIC CHLORIDES
                  Filed Aug. 14, 1930        2 Sheets-Sheet 1
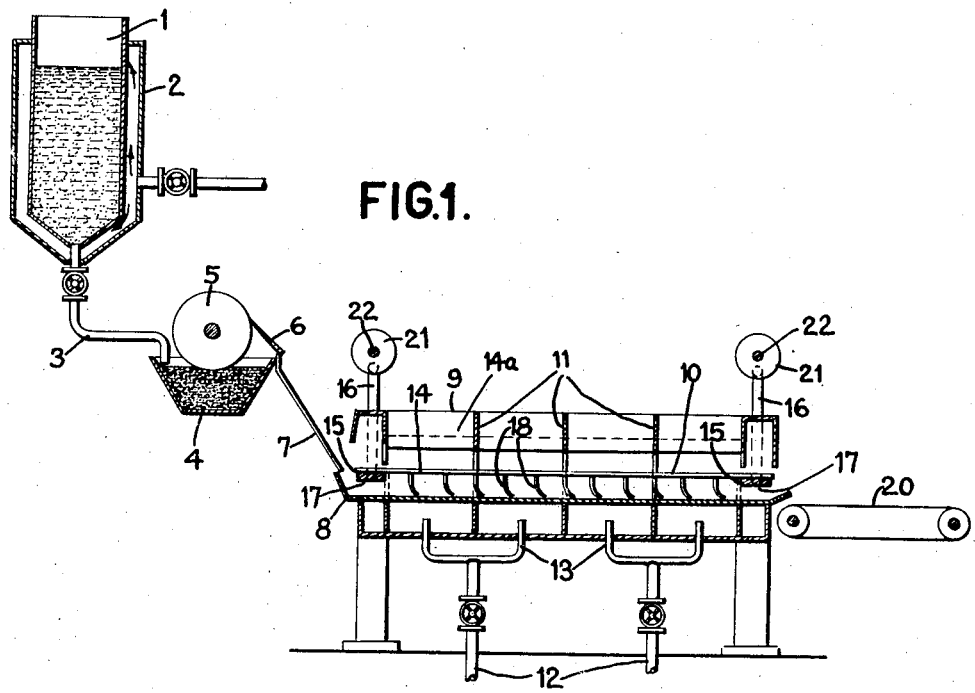

Oct. 24, 1933.   O. V. MARTIN   1,932,364
APPARATUS FOR PREPARING METALLIC CHLORIDES
Filed Aug. 14, 1930   2 Sheets-Sheet 2

Otto V. Martin
INVENTOR

BY ATTORNEY

Patented Oct. 24, 1933

1,932,364

UNITED STATES PATENT OFFICE 1,932,364

APPARATUS FOR PREPARING METALLIC CHLORIDES

Otto V. Martin, Sand Springs, Okla., assignor to Texaco Salt Products Company, New York, N. Y., a corporation of Delaware Application August 14, 1930. Serial No. 475,271

3 Claims. (Cl. 34—25)

This invention relates to apparatus for the preparation of metallic chlorides.

In its broadest aspect the invention contemplates apparatus for the preparation of metallic chlorides such as calcium or magnesium chloride or the like, particularly in the anhydrous form wherein a solution of the salt is treated to produce salt in comminuted form consisting substantially of hydrates of the salt and the resulting particles are brought into contact with streams of unsaturated gas to remove water from the particles at relatively low temperatures and thereby produce the desired product.

Heretofore in the preparation of anhydrous metallic salts, such as calcium chloride, it has been the usual practice to charge the concentrated calcium chloride solution, composed largely of hydrates having roughly thirty per cent of water associated therewith either as water of sclution or as water of crystallization, to heated kettles wherein the solution may be subjected to prolonged and vigorous heating at relatively high temperatures to remove the water of solution or of crystallization. This method is expensive and difficultly operable, due to the excessive heating that must be applied to the kettle in order to drive off the water.

Moreover, the metallic chlorides, particularly those of calcium and magnesium, possess the peculiar property of being extremely soluble, which militates in a large measure against readily producing the anhydrous product by heating in this manner while in substantially liquid form, since with increasing temperatures the salts become increasingly more soluble in the water which is present and which it is being attempted to remove.

When the salt undergoing treatment by conventional methods in kettles is finally dehydrated, there remains in the kettle a dense hard cake-like mass of substantially anhydrous salt which must be removed therefrom with considerable difficulty, after which it may be subjected to grinding in a mill to convert it into desired granular or pulverulent form suitable for handling and for commercial use. Such grinding is objectionable, since it may be productive of a large amount of undesired fine material with considerable variation in the size and shape of the resulting particles.

On the other hand, where the salt in the form of particles of hydrated material is subjected to dehydration in a kiln wherein it is subjected to rigorous heating, the greater portion of the particles may be ruptured or burst by the sudden escape of moisture impaled within the interior of the particle and which has been suddenly converted into vapor as a result of excessive or rapid heating.

In the preparation of anhydrous salt with the apparatus of my invention the particles of salt are contacted with unsaturated gas under conditions such that the particles absorb a minimum amount of heat from the gas and the moisture is gradually and uniformly removed from the particles to produce a product comprising particles of substantially uniform size and shape and which have not been deformed as in the case of the prior art product which has undergone harsh treatment or rigorous heating in order to produce it in the anhydrous form.

Due to the relatively low temperatures employed when using the apparatus of my invention I am able to produce an anhydrous chloride which is free from the basic materials which are usually present in the anhydrous salt prepared by dehydrating the salt at high temperatures as in the ordinary methods of manufacture. For example, during the preparation of anhydrous calcium chloride by dehydration at high temperatures a chemical reaction may occur to a certain extent between the chloride and the water associated therewith forming appreciable amounts of calcium oxide with evolution of hydrogen chloride.

The product as hitherto produced in the industry usually contains other impurities, particularly oxides of iron or of other metals from which the kettles or dehydrating apparatus may be fabricated, due to the fact that at the high temperatures customarily employed the salt solution undergoing treatment, or the products of secondary reaction occurring within the solution, react to an appreciable extent with the metal with which the solution is in contact. As a result of these impurities the product hitherto available is usually of a dark greyish color and dirty in appearance, whereas the product prepared by my process is distinctly white in color and clean in appearance, due to the complete absence of this foreign matter.

My invention therefore contemplates apparatus for the preparation of anhydrous metallic chloride from aqueous solutions of the salt, comprising means for treating the solution to produce the salt in comminuted form consisting substantially of hydrates of the salt, and dehydrating apparatus in combination therewith comprising a chamber wherein the salt particles disposed in a shallow bed and while subjected to stirring are brought into contact with streams of unsaturated gas at relatively low temperatures to remove water from the particles and thereby produce the desired product.

In order to more clearly understand the invention, reference will now be made to the figures of the accompanying drawings illustrating a preferred embodiment of apparatus adapted to the practice of the invention, and in which:

Figure 1 is a diagrammatic elevational view illustrating apparatus arranged to carry out the invention.

Figure 2 is a cross sectional view of the dehydrator shown in Figure 1.

Figure 3:
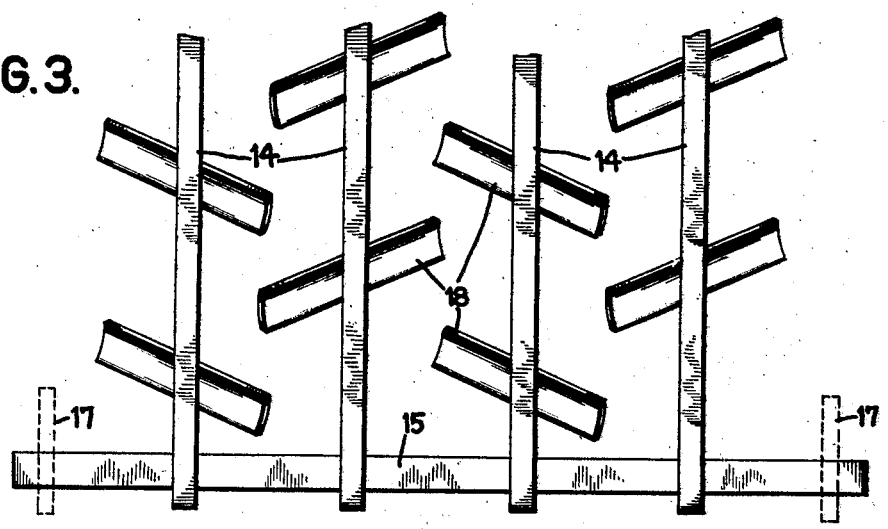
Figure 3 illustrates a portion of the rake or agitating means employed in the dehydrator of Figures 1 and 2.

Referring to Figures 1 and 2 the salt solution is charged to a kettle 1, having a jacket 2 into which a heating medium may be introduced, wherein water is removed by boiling to form a molten or fused mass of material still containing substantially the amount of water required to form hydrates of the salt upon cooling. The fluid hydrate may then be delivered through a pipe 3 to a pan 4 into which the surface of a roll 5 dips. The roll, which may be of more or less conventional type, picks up the molten mass and carries it around, while cooling it, until scraped off in flake-like form by a knife or blade 6. The roll may be cooled by passing water through its interior.

While the formation of flakes is thus described, it is contemplated that the material may be converted into any other suitable lump-like or pulverulent state by other mechanical means prior to dehydration.

The flakes are then delivered by a chute or conveying means 7 to a shallow pan or shelf 8 in a dehydrating oven 9 and over which pan they are moved while subjected to rolling and stirring, by a rake 10, which will presently be described in connection with the discussion of the remaining figures.

The oven 9 comprises an elongated chamber having transverse partitions 11 dividing it into a plurality of successive and separate dehydrating zones through which the pan 8 extends and through which separate and parallel streams of gas flow over and across the particle bed in a direction at right angles to the general path of flow of salt through the oven.

The gas which may comprise either air or gas derived from the combustion of oil or other material, and which may be conditioned either by heating or refrigerating in order to have a desired degree of unsaturation, is conducted from a source, not shown in the drawings, by pipes 12 and introduced through branch pipes 13 to the dehydrator 9. Preferably, the gas is introduced to the dehydrator beneath the pan 8 from which point it may divide to flow around both sides of the pan and thence across the top over the mass of salt particles deposited thereon to the discharge port 14a extending along the top of the dehydrator from which it may be discharged to the atmosphere.

While the use of gas or air from a remote source has been described it is contemplated that fuel gas may, if desired, be conducted to the branch pipes 13 on which suitable burner tips may be secured so as to promote combustion within the chamber below the pan 8 to form hot gaseous products of combustion which flow under and around the sides of the pan 8 in the manner already described.

Figure 4:
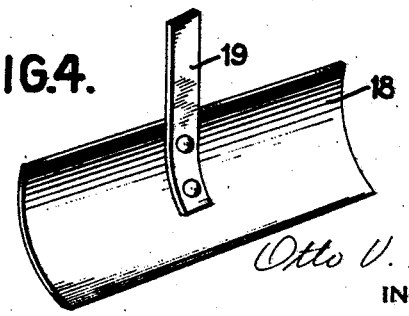
Figure 4 illustrates a scoop element of the rake shown in the preceding figures.

The rake 10 comprises, as shown in Figures 2, 3 and 4, a framework consisting of a plurality of longitudinal and parallel members 14, the ends of which are preferably rigidly attached to cross members 15 whose ends project thru suitable slots provided in the sides of the dehydrator and to which the depending crank arms 16 are rigidly secured. Bearings 17 exteriorly attached to the walls of the dehydrator serve as slides over which the projecting ends of the cross members 15 move while supporting the rake throughout a portion of its forward and backward travel as will be described in more detail in connection with Figures 5 and 6.

Curved plates or scoops 18 are rigidly secured at suitable intervals to and depend below the parallel members 14 by handles or shanks 19, so that their horizontal edges are angularly disposed with reference to the parallel members 14. The propelling faces of the scoops in each row are alternately inclined towards and away from those in adjacent rows, while those in one row are staggered with respect to those in the next. The degree of this inclination of the scoops or scrapers either toward or away from each other is preferably so chosen as to impart the maximum amount of rolling or ploughing motion to the particle mass and yet obtain a suitable rate of forward movement of the mass thru the dehydrator. That is, in moving thru the dehydrator, portions of the particle or crystal mass are intermittently rolled over and pushed along the pan 8 in a zigzag direction so as to constantly re-expose the surfaces of the particles or crystals to direct contact with the unsaturated drying gas until finally discharged in a dehydrated state onto a conveyor 20 to be delivered for packaging or other disposition.

Reciprocatory motion is imparted to the rake 10 by crank wheels 21 rigidly mounted on shafts 22 exteriorly supported above the dehydrator and to which the crank arms 16, previously mentioned, are rotatably attached by crank pins 23. The shafts 22 are operably connected to suitable driving means, not shown, adapted to impart synchronous rotary movement thereto.

Figure 5:
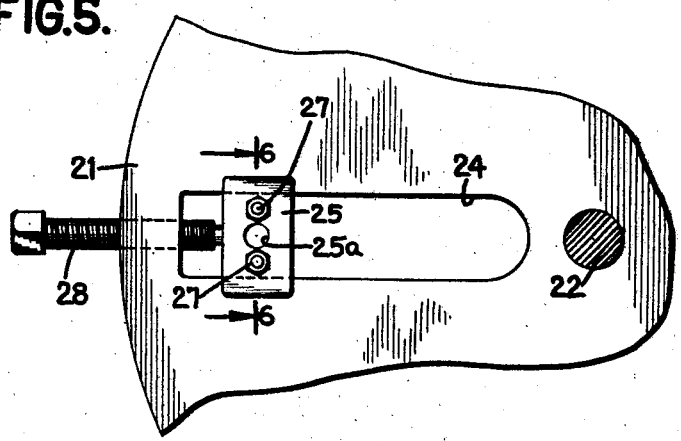
Figure 5 illustrates mechanism adapted to regulate the operation of the rake shown in the preceding figures.
Figure 6:
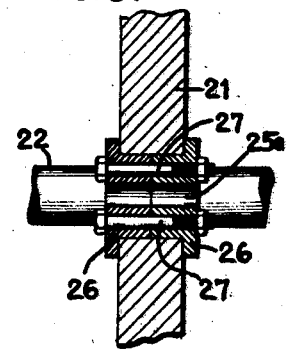
Figure 6 is a sectional view taken on the line 6—6 of Figure 5.

As shown in Figures 5 and 6 the crank wheels 21 are provided with an elongated radial slot 24 adapted to accommodate a sliding cross-head member 25 having a hole 25a to receive the crank pins 23 which are rigidly secured to the upper ends of the crank arms 16. The sliding member 25 preferably comprises two similar sections 26 clamped together by bolts 27 to thereby permit its insertion or removal from the slot 24.

In operation the cross-head member 25 moves back and forth in the slot as the crank wheel rotates, the weight of the rake holding it out towards the periphery of the wheel during that portion of the rotary movement of the wheel where the slot is inclined downwards from the axis of the wheel, and then tending to hold it inwards towards the axis of the wheel during the remainder of the rotary movement. The length of the arms 16 is chosen such that the rake is held above and out of contact with the slide bearings 17 when the cross-head 25 is moving in that portion of the slot 24 relatively near the periphery of the crank wheels; otherwise, if at the position corresponding to the maximum horizontal throw of the crank wheel the rake were already in contact with the fixed slide bearing 17, continued rotation of the crank wheels would be prevented.

Thus the rake describes a semi-elliptical movement wherein it moves downwardly forward into contact with the pulverulent material, moves horizontally forward rolling the material with it, until with continued forward movement it rises upwardly out of the particle mass. When completely clear of the particle mass it moves backward in a similar manner preparatory to again engaging the particle mass.

An adjustable set screw 28 extending radially thru the periphery of the wheel 21 and projecting into the slot 24 serves as a means of regulating the sliding movement of the crosshead 25 along the slot 24. As the distance along the slot from the axis of the wheel 21 thru which the cross-head slides is decreased, by projecting the screw 28 further into the slot 24, the horizontal back and forth movement of the rake is also correspondingly limited thereby decreasing the amount of rolling exerted upon the particles and also distance thru which they are moved over the pan 9 in each forward stroke of the rake.

In the practice of my invention for the preparation of anhydrous calcium chloride, I may charge a salt containing solution, which may comprise roughly from 30 to 40 per cent by weight of solid matter, to the vessel 1 wherein a large proportion of the water is driven off to form a fused or molten mass of salt comprising from 60 to 80 per cent of anhydrous material ($CaCl_2$) which is largely in the form of hydrates, ($CaCl_2.4H_2O$, $CaCl_2.2H_2O$, etc.) when cooled.

The resulting fused material is transferred thru the pipe 3 to the pan 4, where by means of the cooling roll 5 and the blade 6 cooperating therewith it is converted into a solid comminuted or flake-like form consisting of salt substantially in the hydrated form.

The particles of hydrated material are then conveyed by the chute 7 to the pan 8 in the dehydrating oven 9 wherein the particles are subjected to stirring or rolling while being intermittently propelled in a zigzag path over the pan 8 by the rake 10 thereby coming into contact with the streams of unsaturated gas flowing thru the successive compartments and over the relatively shallow mass of moving particles disposed over the pan. The unsaturated gas preferably at a temperature not in excess of 300° F. absorbs the water from the particles thereby producing salt in the anhydrous state which is discharged from the pan 8 onto the conveyor 20 for packaging or for other disposition.

In this way I am able to produce salt substantially entirely in the anhydrous form or containing not less than 99½ per cent of anhydrous salts. The particles or flakes have a very high degree of porosity and uniformity of structure, since they are subjected to moderate treatment and handling and the water of crystallization is gradually removed and absorbed therefrom by the gas, leaving particles having innumerable fine pores from and thru which the water was removed during the drying step so that the size or external shape of each particle remains substantially unchanged from what it was prior to dehydration.

I have found that flowing a plurality of hot streams of gas across a relatively narrow bed in this manner rather than employing countercurrent flow of salt and hot or unsaturated gas is more effective from the standpoint of satisfactorily removing the water of crystallization from the particles. In this way the particles are maintained continually in contact with relatively unsaturated gas since the gas while flowing across the mass of particles does not remain in contact therewith for a sufficient length of time to approach complete saturation with water removed from the particles.

The rate at which dehydration takes place may be closely regulated by maintaining different temperatures in the successive dehydrating zones, or by varying the volume and condition of the gas passing thru the different zones, such as, its degree of initial saturation or its temperature. Ordinarily I maintain a temperature gradient throughout the dehydrator such that the temperature of the atmosphere within the first compartment or zone may be around 150° F. while that in the last zone is about 300° F. although by employing cold unsaturated gas or air correspondingly lower temperatures may prevail in the dehydrator while producing the desired anhydrous product.

Obviously many modifications and variations of the invention, as hereinbefore set forth, may be made without departing from the spirit and scope thereof, and therefore only such limitations should be imposed as are indicated in the appended claims.

I claim:

1. A dehydrator adapted to remove water from hydrated salt in comminuted form, comprising a horizontally disposed chamber having a series of vertical transverse partitions spaced at intervals throughout its length to form a series of compartments therein, a pan extending thru the compartments and supported within the chamber to receive the particles of salt, agitating means adapted to stir the particles and propel them over the surface of the pan, and means for separately flowing streams of unsaturated gas through the compartments wherein it flows in contact with the particles moving over the surface of the pan to absorb water from the particles of salt.

2. A dehydrator adapted to remove water from hydrated salt in comminuted form, comprising a horizontally disposed chamber having a series of vertical transverse partitions spaced at intervals throughout its length to form a series of compartments therein, a pan extending thru the compartments and supported within the chamber to receive the particles of salt, a rake operably mounted above the pan having a plurality of scoops and adapted to intermittently engage the particles and roll them over the surface of the pan and means for separately flowing streams of unsaturated gas through the compartments wherein it flows transversely across the pan over the particles to absorb water from the particles of salt.

3. A dehydrator adapted to remove water from hydrated salt in comminuted form, comprising a horizontally disposed chamber having a series of vertical transverse partitions spaced at intervals throughout its length to form a series of compartments therein, a pan extending thru the compartments and supported within the chamber to receive the particles of salt, a rake operably mounted above the pan having a plurality of scoops and adapted to intermittently engage the particles and roll them over the surface of the pan, adjustable means for regulating the movement of the rake and means for separately flowing streams of unsaturated gas through the compartments wherein it flows transversely across the pan over the particles to absorb water from the salt.

OTTO V. MARTIN.